United States Patent
Klimke et al.

(10) Patent No.: US 8,680,207 B2
(45) Date of Patent: *Mar. 25, 2014

(54) HETEROPHASIC POLYPROPYLENE RESIN

(75) Inventors: Katja Klimke, Linz (AT); Petar Doshev, Linz (AT)

(73) Assignee: Borealis AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/504,899

(22) PCT Filed: Oct. 21, 2010

(86) PCT No.: PCT/EP2010/006449
§ 371 (c)(1),
(2), (4) Date: Apr. 27, 2012

(87) PCT Pub. No.: WO2011/050926
PCT Pub. Date: May 5, 2011

(65) Prior Publication Data
US 2012/0214947 A1  Aug. 23, 2012

(30) Foreign Application Priority Data

Oct. 29, 2009 (EP) .................................... 09013647

(51) Int. Cl.
*C08F 8/00* (2006.01)
*C08L 23/04* (2006.01)
*C08L 23/10* (2006.01)

(52) U.S. Cl.
USPC .......................................... 525/191; 525/240

(58) Field of Classification Search
USPC .................................. 525/191, 240
See application file for complete search history.

(56) References Cited

U.S. PATENT DOCUMENTS 8,044,135 B2 * 10/2011 Doufas et al. ................. 524/528
2012/0220727 A1 * 8/2012 Klimke et al. ................. 525/240

FOREIGN PATENT DOCUMENTS

| EP | 0887379 A1 | 12/1998 |
| EP | 0991719 B1 | 12/2003 |
| EP | 1619217 A1 | 1/2006 |
| EP | 2072546 A1 | 6/2009 |
| EP | 2072576 A1 | 6/2009 |
| WO | 92/12182 A1 | 7/1992 |
| WO | 94/28034 A1 | 12/1994 |
| WO | 01/36502 A1 | 5/2001 |
| WO | 01/48034 A1 | 7/2001 |
| WO | 03/051934 A2 | 6/2003 |

OTHER PUBLICATIONS

International Search Report and Written Opinion for International Application No. PCT/EP2010/006449.

* cited by examiner

*Primary Examiner* — Nathan M Nutter
(74) *Attorney, Agent, or Firm* — Roberts, Mlotkowski, Safran & Cole, P.C.

(57) ABSTRACT

Heterophasic polypropylene resin comprising a propylene random copolymer matrix phase (A), and an ethylene-propylene copolymer rubber phase (B) dispersed within the matrix phase wherein the heterophasic polypropylene resin has a MFR (2.16 kg, 230° C.) of 1.0 to 100 g/10 min, determined according to ISO 1133, and a fraction soluble in p-xylene at 25° C. (XCS fraction) which is present in the resin in an amount of 28 to 50 wt %, and which has a molecular weight distribution ($M_w/M_n$) of 1.0 to 4.0.

13 Claims, No Drawings

HETEROPHASIC POLYPROPYLENE RESIN

The present invention relates to a heterophasic polypropylene resin comprising a propylene random copolymer matrix phase and an ethylene-propylene copolymer rubber phase dispersed within the matrix phase showing a high softness, excellent low temperature impact properties and a high melting temperature. Further, it relates to a process for producing such a polypropylene resin and the use of such a resin for the production of an article.

Today, polyethylene is used as the material of choice for the insulation and semiconductive layers in power cables due to the ease of processing and the beneficial electrical properties. In order to assure good operating properties at operating temperatures (90° C.) the polymers are crosslinked. A drawback of such crosslinked polyethylene material is the remaining crystalline fraction of the polyethylene which melts at about 110° C. This might create some problems at the emergency temperature (~135° C.).

Nowadays attempts are undertaken to replace known cable layers based on polyethylene by cable layers based on polypropylene. Various polypropylene types have been suggested tailored for individual purposes.

Well-known polypropylenes of commerce are particularly isotactic, semi-crystalline, thermoplastic polymer materials with excellent cost- to performance ratio. However, their brittleness under high speed and especially low temperature impact loading limits its utilisation as engineering thermoplastic.

A well known approach for improving the toughness of an isotactic polypropylene is the incorporation of ethylene-propylene copolymer as dispersed phase into the polypropylene matrix.

For instance, EP 1 619 217 A1 provides cable layer of heterophasic propylene polymer with good results in view of softness and toughness, even though the toughness at low temperature could be still improved. Also the polymer cannot be extruded at high line speeds, which however is appreciated under commercial aspects.

EP 2 072 576 A1 relates to cable layer of polypropylene as well as its use. An increase in low temperature toughness was achieved by reactive modification with at least bifunctionally unsaturated compounds.

Soft heterophasic polypropylene copolymers with low tensile modulus and high comonomer content are prepared in EP 0 991 719. Heterophasic polypropylene copolymers with a tensile modulus between 200 and 340 MPa are obtained. However, the heterophasic polypropylene copolymers exhibit inferior impact properties especially at low temperatures.

Considering the above disadvantages it is an object of the present invention to overcome the above disadvantages and to provide a polypropylene resin that shows a high softness together with excellent impact properties especially at low temperature and at the same time a high melting temperature.

The present invention is based on the finding that the above object can be achieved if a propylene random copolymer as a matrix phase is combined with a dispersed phase comprising an ethylene-propylene copolymer rubber with a high amount of propylene monomer units to yield a heterophasic propylene random copolymer resin having a high melt flow rate.

Hence, the present invention provides a heterophasic polypropylene resin comprising a propylene random copolymer matrix phase (A), and an ethylene-propylene copolymer rubber phase (B) dispersed within the matrix phase, wherein the heterophasic polypropylene resin having a MFR (2.16 kg, 230° C.) of 1.0 to 100 g/10 min, determined according to ISO 1133, further has a fraction soluble in p-xylene at 25° C. (XCS fraction) being present in the resin in an amount of 28 to 50 wt % and having a molecular weight distribution ($M_w/M_n$) of 1.0 to 4.0.

It has surprisingly been found that a heterophasic polypropylene resin with these characteristics shows a high softness, and at the same time improved low-temperature impact properties and a high melting temperature.

The term "heterophasic polypropylene resin" used herein denotes a crystalline isotactic polypropylene matrix phase in which an amorphous phase is dispersed.

Crystalline matrix phase denotes a phase wherein an amount of at least 90 wt %, more preferably of at least 93 wt % and most preferably of at least 95 wt % is insoluble in p-xylene at 25° C.

Amorphous phase denotes a phase wherein an amount of at least 90 wt %, more preferably of at least 93 wt % and most preferably of at least 95 wt % is soluble in p-xylene at 25° C.

The fraction soluble in p-xylene (XCS fraction) is denoted as the fraction of the heterophasic polypropylene resin that is soluble in p-xylene at 25° C. representing for the most part amorphous ethylene-propylene copolymer.

The fraction insoluble in p-xylene at 25° C. (XCU fraction) is meant to be the fraction of the heterophasic polypropylene resin that is not soluble in p-xylene at 25° C. representing for the most part the isotactic propylene random copolymer matrix phase.

The melt flow rate (MFR) is measured according to ISO 1133 in g/10 min.

Propylene matrix phase (A) may consist of a single propylene random copolymer, but matrix phase (A) may also comprise a mixture of different propylene homo- or copolymers comprising at least one propylene random copolymer. This also applies for all preferred embodiments of component (A). In a preferred embodiment matrix phase (A) consists of a single propylene random copolymer.

The ethylene-propylene copolymer rubber phase (B) may consist of a single compound, but may also comprise a mixture of different compounds. This also applies for all preferred embodiments of component (B).

Matrix phase (A) preferably has a comonomer content of 0.1 to 4.5 wt %, more preferably of 0.5 to 3.5 wt %, and most preferably of 0.9 to 2.5 wt %.

Furthermore, the comonomer units in matrix phase (A) are preferably selected from a group consisting of alpha-olefins having 2 and/or from 4 to 12 carbon atoms. It is especially preferred that the comonomer units in matrix phase (A) are ethylene comonomer units.

It is preferred that the fraction insoluble in p-xylene at 25° C. (XCU) is present in the polypropylene resin in an amount of 70 to 50 wt %, more preferably of 67 to 53 wt %, and most preferably of 64 to 57 wt %.

The XCU phase preferably has an amount of comonomer units of 0.5 to 6.0 wt %, more preferably of 1.0 to 5.0 wt %, and most preferably of 1.5 to 4.5 wt %.

Furthermore, the XCU phase preferably has a weight average molecular weight ($M_w$) of 100 to 650 kg/mol, more preferably of 150 to 550 kg/mol, and most preferably of 200 to 500 kg/mol, measured by GPC according to ISO 16014-1 and -4.

In addition, the XCU phase preferably has an intrinsic viscosity of 0.5 to 3.5 dl/g, more preferably of 1.0 to 3.0 dl/g and most preferably of 1.1 to 2.8 dl/g, determined according to DIN EN ISO 1628-1 and -3.

The fraction soluble in p-xylene at 25° C. (XCS) is present in the heterophasic polypropylene resin in an amount of 28 to 50 wt %, preferably of 31 to 47 wt %, and more preferably of 32 to 43 wt %.

The XCS phase preferably has an amount of ethylene comonomer units of 10 to 25 wt %, more preferably of 15 to 24 wt %, and most preferably of 18 to 23 wt %.

The fraction soluble in p-xylene at 25° C. (XCS) has a molecular weight distribution ($M_w/M_n$) of 1.0 to 4.0, preferably of 2.0 to 3.7 and more preferably of 2.8 to 3.5.

Furthermore, the XCS phase preferably has a weight average molecular weight ($M_w$) of 100 to 350 kg/mol, more preferably of 150 to 300 kg/mol, and most preferably of 180 to 250 kg/mol, measured by GPC according to ISO 16014-1 and -4.

Furthermore, the XCS phase preferably has a number average molecular weight ($M_n$) of 30 to 160 kg/mol, more preferably of 40 to 140 kg/mol, and most preferably of 60 to 90 kg/mol, measured by GPC according to ISO 16014-1 and -4.

In addition, the XCS phase preferably has an intrinsic viscosity of 1.0 to 3.0 dl/g, more preferably of 1.2 to 2.4 dl/g and most preferably of 1.3 to 1.9 dl/g, determined according to DIN EN ISO 1628-1 and -3.

The heterophasic polypropylene resin according to the invention has a melt flow rate MFR (2.16 kg, 230° C.) of at least 1.0 g/10 min, preferably of at least 2.0 g/10 min, more preferably of at least 2.1 g/10 min and most preferably of at least 2.2 g/10 min, determined according to ISO 1133.

Further, the melt flow rate MFR (2.16 kg, 230° C.) of the heterophasic polypropylene resin according to the invention is not more than 100 g/10 min, preferably not more than 50 g/10 min, more preferably not more than 9.5 g/10 min, even more preferably not more than 8.0 g/10 min and most preferably not more than 6.5 g/10 min, determined according to ISO 1133.

The heterophasic polypropylene resin according to the invention preferably has a melting temperature ($T_m$) of 130 to 150° C., more preferably of 133 to 148° C. and most preferably of 136 to 147° C., determined according to ISO 11357-1, -2 and -3.

Furthermore, the heterophasic polypropylene resin according to the invention preferably has a crystallisation temperature ($T_c$) of 90 to 120° C., more preferably of 95 to 115° C., and most preferably of 98 to 112° C., determined according to ISO 11357-1, -2 and -3.

The heterophasic polypropylene resin according to the invention preferably has a tensile modulus of 150 to 500 MPa, more preferably of 180 to 470 MPa, and most preferably of 200 to 450 MPa, determined according to ISO 527-2.

Furthermore, the heterophasic polypropylene resin according to the invention preferably has an elongation at break of 400 to 700%, more preferably of 430 to 650% and more preferably of 450 to 630%, determined according to ISO 527-2.

The heterophasic polypropylene resin according to the invention preferably has a Charpy notched impact strength at 23° C. of 50 to 150 kJ/m$^2$, more preferably of 70 to 130 kJ/m$^2$ and most preferably of 80 to 120 kJ/m$^2$, determined according to ISO 179-1/1eA.

Additionally, the heterophasic polypropylene resin preferably has a Charpy notched impact strength at −20° C. of 30 to 150 kJ/m$^2$, more preferably of 50 to 130 kJ/m$^2$ and most preferably of 70 to 120 kJ/m$^2$, determined according to ISO 179-1/1eA.

The heterophasic polypropylene resin according to the invention preferably withstands a maximum instrumented falling weight force at −20° C. of 1000 to 5000 N, more preferably of 2000 to 5000 N, and most preferably of 3000 to 5000 N, determined according to ISO 6603-2.

The heterophasic polypropylene resin according to the invention preferably has a maximum instrumented falling weight deflection at −20° C. of 6 to 18 mm, more preferably of 8 to 16 mm, and most preferably of 10 to 14 mm, determined according to ISO 6603-2.

The heterophasic polypropylene resin according to the invention preferably has a ductile type of failure in the instrumented falling weight test, determined according to ISO 6603-2 at a temperature of −20° C.

The preferred high values for Charpy notched impact strength and instrumented falling weight impact indicate excellent impact properties of the polypropylene resin especially at low temperatures.

In a preferred embodiment the heterophasic polypropylene resin has been produced in a multi-stage process. Multistage processes include also bulk/gas phase reactors known as multizone gas phase reactors.

The heterophasic polypropylene resin according to this invention is obtainable by a catalyst system comprising an asymmetric catalyst, whereby the catalyst system has a porosity of less than 1.40 ml/g, more preferably less than 1.30 ml/g and most preferably less than 1.00 ml/g.

The porosity has been measured according to DIN 66135 ($N_2$). In another preferred embodiment the porosity is below detection limit when determined with the method applied according to DIN 66135.

The catalyst system may further comprise an activator as a cocatalyst, as described in WO 03/051934, which is incorporated herein by reference in its entirety.

An asymmetric catalyst according to this invention is a catalyst comprising at least two organic ligands which differ in their chemical structure.

Furthermore it is preferred, that the catalyst system has a surface area of less than 25 m$^2$/g, yet more preferred less than 20 m$^2$/g, still more preferred less than 15 m$^2$/g, yet still less than 10 m$^2$/g and most preferred less than 5 m$^2$/g. The surface area according to this invention is measured according to ISO 9277 ($N_2$).

It is in particular preferred that the catalytic system according to this invention comprises an asymmetric catalyst, i.e. a catalyst as defined below, and has porosity not detectable when applying the method according to DIN 66135 ($N_2$) and has a surface area measured according to ISO 9277 ($N_2$) less than 5 m$^2$/g.

Preferably, the asymmetric catalyst employed comprises an organo-metallic compound of a transition metal of group 3 to 10 or the periodic table (IUPAC) or of an actinide or lanthanide.

The asymmetric catalyst is more preferably of a transition metal compound of formula (I)

$$(L)_m R_n M X_q \qquad (I)$$

wherein

M is a transition metal of group 3 to 10 of the periodic table (IUPAC), or of an actinide or lanthanide, each X is independently a monovalent anionic ligand, such as σ-ligand, each L is independently an organic ligand which coordinates to M, R is a bridging group linking two ligands L, m is 2 or 3, n is 0 or 1, q is 1, 2 or 3, m+q is equal to the valency of the metal, and with the proviso that at least two ligands "L" are of different chemical structure.

Said asymmetric catalyst is preferably a single site catalyst (SSC).

In a more preferred definition, each "L" is independently (a) a substituted or unsubstituted cycloalkyldiene, i.e. a cyclopentadiene, or a mono-, bi- or multifused derivative of a cycloalkyldiene, i.e. a cyclopentadiene, which optionally bear further substituents and/or one or more hetero ring atoms from a Group 13 to 16 of the Periodic Table (IUPAC); or (b) an acyclic, $\eta^1$- to $\eta^4$- or $\eta^6$-ligand composed of atoms from Groups 13 to 16 of the Periodic Table, and in which the open chain ligand may be fused with one or two, preferably two, aromatic or non-aromatic rings and/or bear further substituents; or (c) a cyclic σ-, $\eta^1$- to $\eta^4$- or $\eta^6$-, mono-, bi- or multidentate ligand composed of unsubstituted or substituted mono-, bi- or multicyclic ring systems selected from aromatic or non-aromatic or partially saturated ring systems and containing carbon ring atoms and optionally one or more heteroatoms selected from Groups 15 and 16 of the Periodic Table.

The term "σ-ligand" is understood in the whole description in a known manner, i.e. a group bonded to the metal at one or more places via a sigma bond. A preferred monovalent anionic ligand is halogen, in particular chlorine (Cl).

In a preferred embodiment, the asymmetric catalyst is preferably of a transition metal compound of formula (I)

$(L)_m R_n M X_q$        (I)

wherein

M is a transition metal of group 3 to 10 of the periodic table (IUPAC), or of an actinide or lanthanide, each X is independently a monovalent anionic ligand, such as σ-ligand, each L is independently an organic ligand which coordinates to M, wherein the organic ligand is an unsaturated organic cyclic ligand, more preferably a substituted or unsubstituted, cycloalkyldiene, i.e. a cyclopentadiene, or a mono-, bi- or multifused derivative of a cycloalkyldiene, i.e. a cyclopentadiene, which optionally bear further substituents and/or one or more hetero ring atoms from a Group 13 to 16 of the Periodic Table (IUPAC), R is a bridging group linking two ligands L, m is 2 or 3, n is 0 or 1, q is 1,2 or 3, m+q is equal to the valency of the metal, with the proviso that at least two ligands "L" are of different chemical structure.

According to a preferred embodiment said asymmetric catalyst compound (I) is a group of compounds known as metallocenes. Said metallocenes bear at least one organic ligand, generally 1, 2 or 3, e.g. 1 or 2, which is η-bonded to the metal, e.g. a $\eta^{2-6}$-ligand, such as a $\eta^5$-ligand. Preferably, a metallocene is a Group 4 to 6 transition metal, more preferably zirconium, which contains at least one $\eta^5$-ligand.

Preferably the asymmetric catalyst compound has a formula (II):

$(Cp)_m R_n M X_q$        (II)

wherein

M is Zr, Hf or Ti, preferably Zr each X is independently a monovalent anionic ligand, such as σ-ligand, each Cp is independently an unsaturated organic cyclic ligand which coordinates to M, R is a bridging group linking two ligands L, m is 2, n is 0 or 1, more preferably 1, q is 1,2 or 3, more preferably 2, m+q is equal to the valency of the metal, and at least one Cp-ligand, preferably both Cp-ligands, is(are) selected from the group consisting of unsubstituted cyclopenadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl, with the proviso in case both Cp-ligands are selected from the above stated group that both Cp-ligands must chemically differ from each other.

Preferably, the asymmetric catalyst is of formula (II) indicated above, wherein

M is Zr each X is Cl, n is 1, and q is 2.

Preferably both Cp-ligands have different residues to obtain an asymmetric structure.

Preferably, both Cp-ligands are selected from the group consisting of substituted cyclopentadienyl-ring, substituted indenyl-ring, substituted tetrahydroindenyl-ring, and substituted fluorenyl-ring wherein the Cp-ligands differ in the substituents bonded to the rings.

The optional one or more substituent(s) bonded to cyclopentadienyl, indenyl, tetrahydroindenyl, or fluorenyl may be independently selected from a group including halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR"$_3$, —SR", —PR"$_2$ and —NR"$_2$, wherein each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl.

More preferably both Cp-ligands are indenyl moieties wherein each indenyl moiety bear one or two substituents as defined above. More preferably each Cp-ligand is an indenyl moiety bearing two substituents as defined above, with the proviso that the substituents are chosen in such are manner that both Cp-ligands are of different chemical structure, i.e both Cp-ligands differ at least in one substituent bonded to the indenyl moiety, in particular differ in the substituent bonded to the five member ring of the indenyl moiety.

Still more preferably both Cp are indenyl moieties wherein the indenyl moieties comprise at least at the five membered ring of the indenyl moiety, more preferably at 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, with proviso that the indenyl moieties of both Cp must chemically differ from each other, i.e. the indenyl moieties of both Cp comprise different substituents.

Still more preferred both Cp are indenyl moieties wherein the indenyl moieties comprise at least at the six membered ring of the indenyl moiety, more preferably at 4-position, a substituent selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp must chemically differ from each other, i.e. the indenyl moieties of both Cp comprise different substituents.

Yet more preferably both Cp are indenyl moieties wherein the indenyl moieties comprise at the five membered ring of the indenyl moiety, more preferably at 2-position, a substituent and at the six membered ring of the indenyl moiety, more preferably at 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, and the further substituent of the six membered ring is selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp must chemically differ from each other, i.e. the indenyl moieties of both Cp comprise different substituents. It is in particular preferred that both Cp are idenyl rings comprising two substituents each and differ in the substituents bonded to the five membered ring of the idenyl rings.

Concerning the moiety "R" it is preferred that "R" has the formula (III)

wherein
Y is C, Si or Ge, and
R' is $C_1$ to $C_{20}$ alkyl, $C_6$-$C_{12}$ aryl, or $C_7$-$C_{12}$ arylalkyl.

In case both Cp-ligands of the asymmetric catalyst as defined above, in particular case of two indenyl moieties, are linked with a bridge member R, the bridge member R is typically placed at 1-position. The bridge member R may contain one or more bridge atoms selected from e.g. C, Si and/or Ge, preferably from C and/or Si. One preferable bridge R is —Si(R')$_2$—, wherein R' is selected independently from one or more of e.g. $C_1$-$C_{10}$ alkyl, $C_1$-$C_{20}$ alkyl, such as $C_6$-$C_{12}$ aryl, or $C_7$-$C_{40}$, such as $C_7$-$C_{12}$ arylalkyl, wherein alkyl as such or as part of arylalkyl is preferably $C_1$-$C_6$ alkyl, such as ethyl or methyl, preferably methyl, and aryl is preferably phenyl. The bridge —Si(R')$_2$— is preferably e.g. —Si($C_1$-$C_6$ alkyl)$_2$—, —Si(phenyl)$_2$— or —Si($C_1$-$C_6$ alkyl)(phenyl)-, such as —Si(Me)$_2$.

In a preferred embodiment the asymmetric catalyst is defined by the formula (IV)

wherein
each X is independently a monovalent anionic ligand, such as σ-ligand, in particular halogen
both Cp coordinate to M and are selected from the group consisting of unsubstituted cyclopentadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl,
with the proviso that both Cp-ligands must chemically differ from each other, and
R is a bridging group linking two ligands L,
wherein R is defined by the formula (III)

wherein
Y is C, Si or Ge, and
R' is $C_1$ to $C_{20}$ alkyl, $C_6$-$C_{12}$ aryl, or $C_7$-$C_{12}$ arylalkyl.

More preferably the asymmetric catalyst is defined by the formula (IV), wherein both Cp are selected from the group consisting of substituted cyclopenadienyl, substituted indenyl, substituted tetrahydroindenyl, and substituted fluorenyl.

Yet more preferably the asymmetric catalyst is defined by the formula (IV), wherein both Cp are selected from the group consisting of substituted cyclopentadienyl, substituted indenyl, substituted tetrahydroindenyl, and substituted fluorenyl with the proviso that both Cp-ligands differ in the substituents, i.e. the subtituents as defined above, bonded to cyclopentadienyl, indenyl, tetrahydroindenyl, or fluorenyl.

Still more preferably the asymmetric catalyst is defined by the formula (IV), wherein both Cp are indenyl and both indenyl differ in one substituent, i.e. in a substituent as defined above bonded to the five member ring of indenyl.

It is in particular preferred that the asymmetric catalyst is a non-silica supported catalyst as defined above, in particular a metallocene catalyst as defined above.

In a preferred embodiment the asymmetric catalyst is dimethylsilyl [(2-methyl-(4'-tert.butyl)-4-phenyl-indenyl)(2-isopropyl-(4'-tert.butyl)-4-phenyl-indenyl)]zirconium dichloride. More preferred said asymmetric catalyst is not silica supported.

The above described asymmetric catalyst components are prepared according to the methods described in WO 01/48034.

It is in particular preferred that the asymmetric catalyst system is obtained by the emulsion solidification technology as described in WO 03/051934. This document is herewith included in its entirety by reference. Hence the asymmetric catalyst is preferably in the form of solid catalyst particles, obtainable by a process comprising the steps of
a) preparing a solution of one or more asymmetric catalyst components;
b) dispersing said solution in a solvent immiscible therewith to form an emulsion in which said one or more catalyst components are present in the droplets of the dispersed phase,
c) solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or a mixture thereof.

Furthermore it is preferred that the emulsion comprising said continuous phase and said dispersed phase is a bi-or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered particles have preferably an average size range of 5 to 200 μm, more preferably 10 to 100 μm.

Moreover, the form of solidified particles have preferably a spherical shape, a predetermined particles size distribution and a surface area as mentioned above of preferably less than 25 $m^2/g$, still more preferably less than 20 $m^2/g$, yet more preferably less than 15 $m^2/g$, yet still more preferably less than 10 $m^2/g$ and most preferably less than 5 $m^2/g$, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

Preferred as cocatalysts for metallocenes and non-metallocenes, if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. Said activators are commercially available or can be prepared according to the prior art literature.

Further aluminoxane cocatalysts are described i.a. in WO 94/28034 which is incorporated herein by reference. These are linear or cyclic oligomers of having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:transition metal e.g. in the range of 1 to 10 000, suitably 5 to 8000, preferably 1a to 7000, e.g. 100 to 4000, such as 1000 to 3000. Typically in case of solid (heterogeneous) catalyst the ratio is preferably below 500.

The quantity of cocatalyst to be employed in the catalyst of the invention is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

Furthermore, the present invention relates to the use of the above-defined catalyst system for the production a heterophasic polypropylene resin according to this invention.

Additionally, the present invention relates to a heterophasic polypropylene composition comprising the inventive heterophasic polypropylene resin and modifiers in an amount of up to 10 wt % as well as additives in an amount up to 1 wt %. These modifiers and/or additives may be included during the polymerisation process or after the polymerisation by melt mixing. Suitable modifiers include other thermoplastics like polyethylene homo- or copolymers, poly-1-butene, poly-4-methylpentene-1 and/or thermoplastic elastomers like ethylene-propylene rubber or styrene elastomers as well as mineral fillers like talc or calcium carbonate. Suitable additives include stabilizers, lubricants, nucleating agents, pigments and foaming agents.

The present invention further relates to a process for producing the heterophasic polypropylene according to the invention, wherein the propylene copolymer matrix phase (A) is prepared in a first stage and the ethylene-propylene copolymer rubber phase (B) is prepared in a second stage in the presence of the first stage product. The multistage process of the invention may include bulk reactors or gas phase reactors in any of the polymerisation stages.

Thereby it is preferred that the propylene random copolymer matrix (A) is produced in a bulk reactor and afterwards transferred to a gas phase reactor in which the ethylene-propylene rubber phase (B) is produced in the presence of component (A).

The bulk polymerisations are preferably performed in a so-called loop reactor.

A preferred multistage process is a "loop-gas phase"-process, such as developed by Borealis A/S, Denmark (known as BORSTAR® technology) described e.g. in patent literature, such as in EP 0 887 379 or in WO 92/12182.

Optionally, the process may also comprise a pre-polymerisation step in a manner known in the field and which may precede the first polymerisation step (a).

The process is preferably a continuous process.

Preferably, in the process for producing the propylene random copolymer as defined above the conditions for the bulk reactor of step (a) may be as follows:
- the temperature is within the range of 40° C. to 110° C., preferably between 60° C. and 100° C., most preferably 70 to 90° C.,
- the pressure is within the range of 20 bar to 80 bar, preferably between 30 bar to 60 bar,
- hydrogen can be added for controlling the molar mass in a manner known per se.

Subsequently, the reaction mixture from the bulk (loop) reactor (step a) is transferred to the gas phase reactor, i.e. to step (b), whereby the conditions in step (b) are preferably as follows:
- the temperature is within the range of 50° C. to 130° C., preferably between 60° C. and 100° C.,
- the pressure is within the range of 5 bar to 50 bar, preferably between 15 bar to 35 bar,
- hydrogen can be added for controlling the molar mass in a manner known per se.

The residence time can vary in both reactor zones. In one embodiment of the process for producing the propylene polymer the residence time in bulk reactor, e.g. loop is in the range 0.5 to 5 hours, e.g. 0.5 to 2 hours and the residence time in gas phase reactor will generally be 1 to 8 hours.

If desired, the polymerisation may be effected in a known manner under supercritical conditions in the bulk, preferably loop reactor, and/or as a condensed mode in the gas phase reactor.

In a further embodiment, the components (A) and (B) are preferably polymerised separately and compounded by melt-mixing.

Preferably, the heterophasic polypropylene resin is produced according to any of the above embodiments of the process.

Further, the present invention relates to an article comprising the heterophasic polypropylene resin according to the invention.

In one embodiment, the article preferably relates to a moulded article, preferably to an injection moulded or blow moulded article.

In another preferred embodiment, the article preferably relates to a wire or cable comprising a layer made of the inventive heterophasic polypropylene composition. It is especially preferred that the layer refers to an insulation layer.

Furthermore, the present invention defines also power cables having an layer comprising the heterophasic polypropylene resin according to the invention. Thus, the invention is directed to power cables comprising at least one conductor and one or more layer(s) wherein at least one layer is the insulation layer as defined in the instant invention. Preferably such a power cable comprises an insulation layer, a semicon and/or a jacketing layer as coating layers. Thus it is preferred that at least one of the insulation layer, the semicon and the jacketing layer is a cable layer of this invention. Even more preferred the insulation layer is a coating layer as defined in the instant invention. Such an insulation layer may comprise also carbon black.

For low voltage applications the power cable system shall preferably either consist of one conductor and one insulation layer, or of one conductor, one insulation layer and an additional jacketing layer, or of one conductor, one semiconductive layer and one insulation layer.

For medium and high voltage applications it shall preferably consist of one conductor, one inner semiconductive layer, one insulation layer and one outer semiconductive layer, optionally covered by an additionally jacketing layer. The semiconductive layers mentioned consist preferably of a thermoplastic polyolefin composition containing a sufficient amount of electrically conducting solid fillers preferably carbon black. At least one of the layers is the inventive cable layer mentioned above. It is preferred that the insulation layer is the inventive cable layer comprising preferably solid fillers, more preferably carbon black.

Not only solid fillers can be incorporated into the insulation layer, but also any other additives suitable for insulation layers for cables.

Moreover, not only the insulation layer but also other layers can comprise the composition as defined above. Hence, the inventive cable layer constitutes also the semiconductive layer and/or the jacketing layer.

The final cable can also consist of multiple conductors or cores (normally 1, 2, 3 or 4) combined with single and common insulation layers.

Still further, the present invention relates to the use of the heterophasic polypropylene resin according to the invention for producing such an article as defined above.

In the following, the present invention is described by way of examples.

EXAMPLES

1. Methods
a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

b) Xylene Soluble Fraction

The xylene soluble fraction (XCS) as defined and described in the present invention is determined as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XCS\ \% = (100 \times m_1 \times v_0)/(m_0 \times v_1),$$

wherein $m_0$ designates the initial polymer amount (grams), $m_1$ defines the weight of residue (grams), $v_0$ defines the initial volume (milliliter) and $v_1$ defines the volume of the analysed sample (milliliter). The fraction insoluble in p-xylene at 25° C. (XCU) is then equal to 100%−XCS %.

c) Intrinsic Viscosity

The intrinsic viscosity (IV) value increases with the molecular weight of a polymer. The intrinsic viscosity of the XCU and the XCS fraction is measured in decalin at 135° C. according to DIN EN ISO 1628-1 and -3.

d) Weight Average Molecular Weight and MWD

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 ml/min. 216.5 μl of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 ml (at 160° C.) of stabilized TCB (same as mobile phase) and keeping for 3 hours with continuous shaking prior sampling in into the GPC instrument.

In case of PP the constants are: K: $19 \times 10^{-3}$ ml/g and a: 0.725 for PP.

e) Melting and Crystallisation Temperature

The melting and crystallisation temperature $T_m$ and $T_c$ are determined according to ISO 11357-1, -2 and -3 with a TA-Instruments 2920 Dual-Cell with RSC refrigeration apparatus and data station. A heating and cooling rate of 10° C./min is applied in a heat/cool/heat cycle between +23 and +210° C., the crystallisation temperature $T_c$ being determined in the cooling step and the $T_m$ melting temperature being determined in the second heating step.

f) Comonomer Content

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt %) via:

$$N=k_1(A/R)+k_2$$

wherein A is the maximum absorbance defined of the comonomer band, R the maximum absorbance defined as peak height of the reference peak and with $k_1$ and $k_2$ the linear constants obtained by calibration. The band used for ethylene content quantification is selected depending if the ethylene content is random (730 cm$^{-1}$) or block-like (720 cm$^{-1}$). The absorbance at 4324 cm$^{-1}$ was used as a reference band.

g) Charpy Notched Impact Strength (NIS)

Charpy impact strength was determined according to ISO 179-1eA:2000 on V-notched samples of 80×10×4 mm$^3$ at 23° C. (Charpy impact strength (23° C.)) and −20° C. (Charpy impact strength (−20° C.)). When not otherwise stated a standard impact velocity of 2.9 m/s was used. Some of the examples were tested with a different impact velocity of 1.5 m/s.

The test specimens were prepared by injection moulding using an IM V 60 TECH machinery in line with ISO 1872-2. The melt temperature was 200° C. and the mold temperature was 40° C.

h) Instrumented Falling Weight Impact (IFW)

The instrumented falling weight impact is determined according to ISO 6603-2 with a velocity of 4.4 m/s on 60×60×2 mm$^3$ plates at −20° C.

i) Tensile Modulus and Elongation at Break

Mechanical properties were determined according to ISO 527-2. Compression moulded specimens of type 1A were used, which were prepared according to ISO 1872-2.

Tensile modulus (in MPa) was determined according to ISO 527-2. The measurement was conducted at 23° C. temperature with an elongation rate of 1 mm/min.

The Elongation at break is the percentage elongation at the moment of rupture of the test specimen.

2. Compositions:

Comparative Examples (CE1, CE3)

Comparative Example CE1 is the commercially available product Borsoft SA233CF (Borealis Polyolefine GmbH, Austria) being a random-heterophasic copolymer with an MFR$_2$ of 0.5 g/10 min, an XS content of 70 wt % and a density of 900 kg/m$^3$. Comparative Example CE3 is the commercially available product Borsoft SD233CF (Borealis Polyolefine GmbH, Austria) being a random-heterophasic copolymer with an MFR$_2$ of 8.0 g/10 min, an XS content of 69 wt % and a density of 900 kg/m$^3$.

Inventive Examples (Ex1, Ex2, Ex3) and Comparative Example (CE2)

Catalyst:

A support-free catalyst (III) has been prepared as described in example 5 of WO 03/051934 whilst using an asymmetric metallocene dimethylsilyl [(2-methyl-(4'-tert.butyl)-4-phenyl-indenyl)(2-isopropyl-(4'-tert.butyl)-4-phenyl-indenyl)] zirconium dichloride.

Polymerisation:

Comparative example CE2 and inventive examples Ex1, Ex2 and Ex3 were prepared in a 2 l bench scale reactor initially filled with N$_2$ at 1 bar gauge. Catalyst, minor amount of triethylaluminum and hydrogen were first added in the reactor. Further on liquid propylene was fed and a pre-polymerization was carried out at 35° C. for 8 min. Stirring was started and the temperature was increased to a set point temperature of 70° C., cf. data table 1. At these conditions the polymerization of the matrix component was carried out. In a subsequent step in the same vessel in the presence of the matrix particles with still active catalyst a gas phase polymerization was conducted to form the ethylene-propylene dispersed phase. The operating temperature in the gas phase was 85° C., cf. data table 1. At the end of the polymerisation, the reactor was vented.

After the polymerisation process the materials were pelletized in the presence of standard antioxidants and process stabilizers, namely 2000 ppm of Irganox B 225 (supplied by Ciba Speciality Chemicals, a blend of % Irganox 1010, Pentaerythrityl-tetrakis(3-(3',5'-di-tert. butyl-4-hydroxyphenyl)-propionate, CAS-no. 6683-19-8 and 50% Irgafos 168, Tris (2,4-di-t-butylphenyl)phosphate, CAS-no. 31570-04-4) and 500 ppm of calcium stearate (supplied by Croda Polymer Additives, CAS-no. 1592-23-0). The melt homogenisation was done on a twin screw extruder with the following temperature profile: Zone 1; Zone 2; Zone 3; Zone 4; Zone 5; of 210° C.; 215° C.; 220° C.; 215° C.; 210° C. accordingly. The screw speed was set to 250 rpm and the throughput to 3 kg/h, the polymer melt being extruded through two circular dies into a cooling water bath for solidification and pelletized subsequently.

The polymer was dried in an oven, assisted by a flow of warm nitrogen, and samples were analysed. The results are summarized in Table 2.

TABLE 1

Polymerisation parameters

|  | Example 1 (Ex1) | Example 2 (Ex2) | Example 3 (Ex3) | Comparative Example 2 (CE2) |
|---|---|---|---|---|
| Bulk Phase: |  |  |  |  |
| Temperature [° C.] | 70 | 70 | 70 | 70 |
| H$_2$ amount [bar] | 0.3 | 0.3 | 0.1 | 0.3 |
| C2/(C2 + C3) [wt %/wt %] | 0.002 | 0.001 | 0.001 | 0.003 |
| Time [min] | 47 | 60 | 77 | 70 |
| Gas Phase: |  |  |  |  |
| Temperature [° C.] | 80 | 80 | 80 | 70 |
| H$_2$ amount [bar] | 0 | 0 | 0 | 0 |
| C2/(C2 + C3) [wt %/wt %] | 0.15 | 0.16 | 0.20 | 0.13 |
| Time [min] | 150 | 175 | 110 | 180 |

The material composition data of the inventive examples Ex1, Ex2 and Ex3 and the comparative examples CE1, CE2 and CE3 are listed in table 2:

TABLE 2

Analytical characterisation

|  | Ex1 | Ex2 | Ex3 | CE1 | CE2 | CE3 |
|---|---|---|---|---|---|---|
| C2 Matrix [wt %] | 2.3 | 1.0 | 1.0 | 4.1 | 4.6 | 2.7 |
| XCS total [wt %] | 41 | 40 | 32 | 31 | 36 | 26 |
| C2 (XCS) [wt %] | 15 | 22 | 22 | 31 | 15 | 30 |
| IV (XCS) [dl/g] | 1.4 | 1.7 | 1.6 | 2.3 | 1.5 | 1.6 |

TABLE 2-continued

Analytical characterisation

|  | Ex1 | Ex2 | Ex3 | CE1 | CE2 | CE3 |
|---|---|---|---|---|---|---|
| $M_w$ (XCS) [kg/mol] | 240 | 230 | 200 | 420 | 210 | 250 |
| $M_w/M_n$ (XCS) | 3.0 | 3.2 | 3.0 | 6.2 | 2.7 | 5.4 |
| C2 (XCU) [wt %] | 4.2 | 2.9 | 3.9 | 8.3 | 4.1 | 5.8 |
| IV (XCU) [dl/g] | 1.9 | 1.7 | 2.0 | 2.7 | 1.9 | 1.9 |
| $M_w$ (XCU) [kg/mol] | 235 | 205 | 260 | 540 | 240 | 245 |
| $M_w/M_n$ (XCU) | 2.5 | 2.4 | 2.5 | 5.2 | 2.4 | 4.9 |

The properties of the inventive examples and the comparative example are compared in Table 3. It can be seen that the inventive examples show clear advantages both in softness and low temperature impact properties while maintaining a high melting temperature and crystallisation temperature.

TABLE 3

Properties of inventive examples Ex1, Ex2 and Ex3 in comparison to comparative examples CE1, CE2 and CE3.

|  | Ex1 | Ex2 | Ex3 | CE1 | CE2 | CE3 |
|---|---|---|---|---|---|---|
| MFR [g/10 min] | 3.0 | 6.0 | 2.2 | 0.5 | 4.0 | 7.0 |
| $T_m$ [° C.] | 137 | 145 | 146 | 141 | 135 | 143 |
| $T_c$ [° C.] | 100 | 107 | 111 | 99 | 99 | 105 |
| Charpy NIS, +23° C. [kJ/m²] | 99 | 103 | 95 | 83 | 108 | 60 |
| Charpy NIS, −20° C. [kJ/m²] | 106 | 104 | 78 | 5 | 13 | 3.1 |
| IFW, Force at Maximum, −20° C. [N] | 3834 | 4470 | 4335 | 273 | 500 | 206 |
| IFW, Deflection at Maximum, −20° C. [mm] | 12.0 | 12.5 | 12.6 | 2.8 | 3.7 | 2.6 |
| IFW, −20° C., Type of failure | ductile | ductile | ductile | brittle | brittle | brittle |
| Tensile Modulus [MPa] | 225 | 290 | 420 | 470 | 345 | 525 |
| Elongation at break [%] | 580 | 611 | 468 | 458 | 589 | 505 |

The invention claimed is:

1. Heterophasic polypropylene resin comprising
a propylene random copolymer matrix phase (A), and
an ethylene-propylene copolymer rubber phase (B) dispersed within the matrix phase
wherein the heterophasic polypropylene resin has a MFR (2.16 kg, 230° C.) of 1.0 to 100 g/10 min, determined according to ISO 1133, and
a fraction soluble in p-xylene at 25° C. (XCS fraction) which is present in the resin in an amount of 28 to 50 wt %, and which has a molecular weight distribution ($M_w/M_n$) of 1.0 to 4.0, and which has an amount of ethylene comonomer units of 10 to 25 wt %.

2. The heterophasic polypropylene resin according to claim 1, wherein the matrix phase (A) has a comonomer content of 0.1 to 4.5 wt %, and wherein the comonomer units in matrix phase (A) are selected from a group consisting of alpha-olefins having 2 and/or from 4 to 12 carbon atoms.

3. The heterophasic polypropylene resin according to claim 1, wherein the XCS fraction has a weight average molecular weight ($M_w$) of 100 to 350 kg/mol, measured by GPC according to ISO 16014-1 and -4.

4. The heterophasic polypropylene resin according to claim 1, wherein the XCS fraction has an intrinsic viscosity of 1.0 to 3.0 dl/g, determined according to DIN EN ISO 1628-1 and -3.

5. The heterophasic polypropylene resin according to claim 1, having a melting temperature ($T_m$) of 130 to 150° C.

6. The heterophasic polypropylene resin according to claim 1, having a crystallisation temperature ($T_c$) of 90 to 120° C.

7. The heterophasic polypropylene resin according to claim 1, having a tensile modulus of 150 to 500 MPa and an elongation at break of 400 to 700%, determined according to ISO 527-2.

8. The heterophasic polypropylene resin according to claim 1, having a Charpy notched impact strength at 23° C. of 50 to 150 kJ/m² and a Charpy notched impact strength at −20° C. of 30 to 150 kJ/m², determined according to ISO 179-1/1 eA.

9. The heterophasic polypropylene resin according to claim 1, withstanding a maximum instrumented falling weight force at −20° C. of 1000 to 5000 N, determined according to ISO 6603-2.

10. The heterophasic polypropylene resin according to claim 1, obtained by a catalyst system comprising an asymmetric catalyst wherein the catalyst system has a porosity of less than 1.40 ml/g.

11. An article comprising the heterophasic polypropylene resin comprising
a propylene random copolymer matrix phase (A), and
an ethylene-propylene copolymer rubber phase (B) dispersed within the matrix phase
wherein the heterophasic polypropylene resin has a MFR (2.16 kg. 230° C.) of 1.0 to 100 g/10 min, determined according to ISO 1133, and a fraction soluble in p-xylene at 25° C. (XCS fraction) which is present in the resin in an amount of 28 to 50 wt %, and which has a molecular weight distribution ($M_w/M_n$) of 1.0 to 4.0, and which has an amount of ethylene comonomer units of 10 to 25 wt %.

12. A power cable having a layer comprising the heterophasic polypropylene resin comprising
a propylene random copolymer matrix phase (A), and
an ethylene-propylene copolymer rubber phase (B) dispersed within the matrix phase
wherein the heterophasic polypropylene resin has a MFR (2.16 kg. 230° C.) of 1.0 to 100 g/10 min, determined according to ISO 1133, and
a fraction soluble in p-xylene at 25° C. (XCS fraction) which is present in the resin in an amount of 28 to 50 wt %, and which has a molecular weight distribution ($M_w/M_n$) of 1.0 to 4.0, and which has an amount of ethylene comonomer units of 10 to 25 wt %.

13. A process for producing the heterophasic polypropylene resin comprising
a propylene random copolymer matrix phase (A), and
an ethylene-propylene copolymer rubber phase (B) dispersed within the matrix phase
wherein the heterophasic polypropylene resin has a MFR (2.16 kg. 230° C.) of 1.0 to 100 g/10 min, determined according to ISO 1133, and
a fraction soluble in p-xylene at 25° C. (XCS fraction) which is present in the resin in an amount of 28 to 50 wt %, and which has a molecular weight distribution ($M_w/M_n$) of 1.0 to 4.0, and which has an amount of ethylene comonomer units of 10 to 25 wt %,
wherein the propylene copolymer matrix phase is prepared in a first stage and the ethylene-propylene copolymer rubber phase (B) is prepared in a second stage in the presence of the first stage product.

* * * * *